United States Patent Office 3,515,659
Patented June 2, 1970

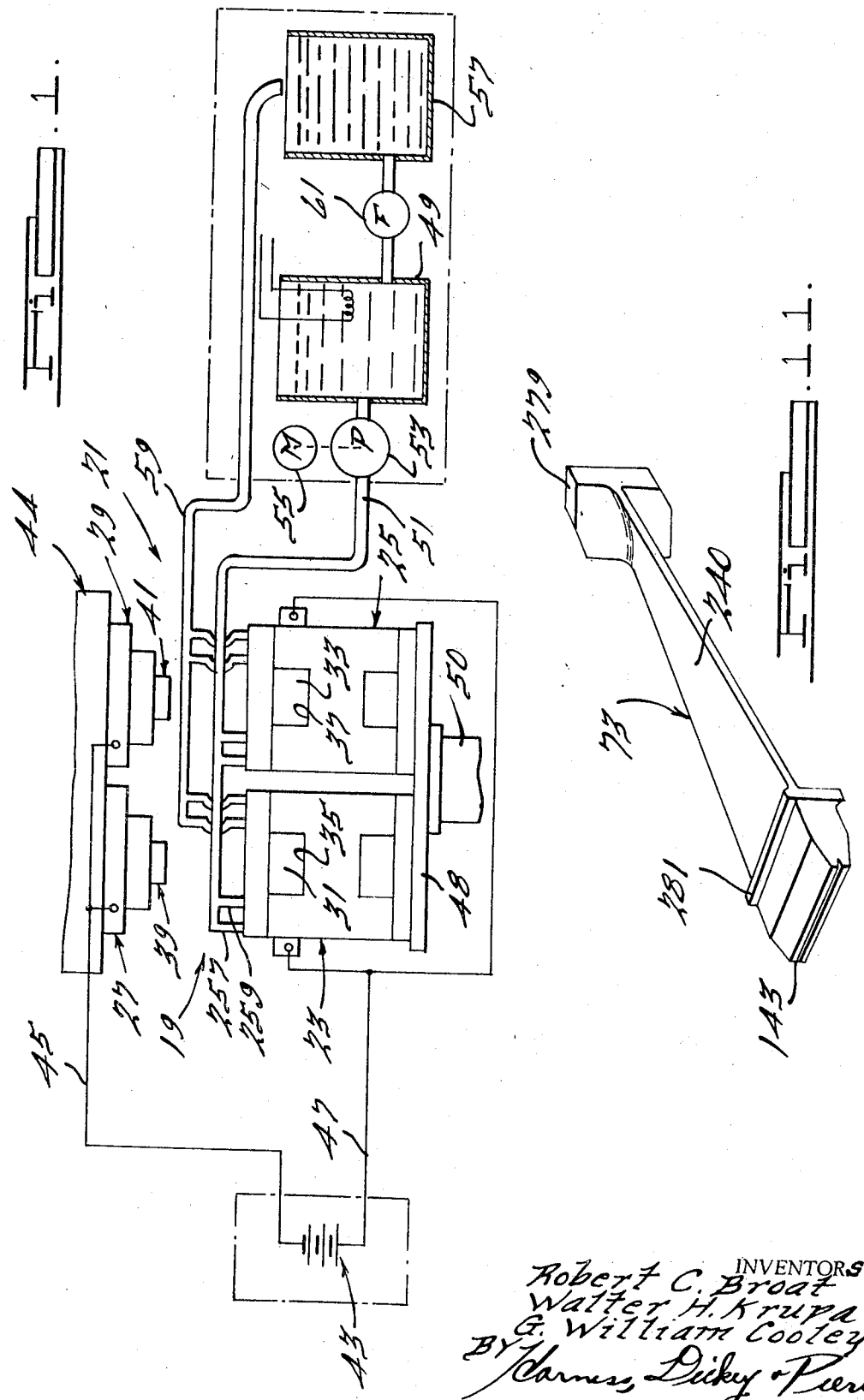

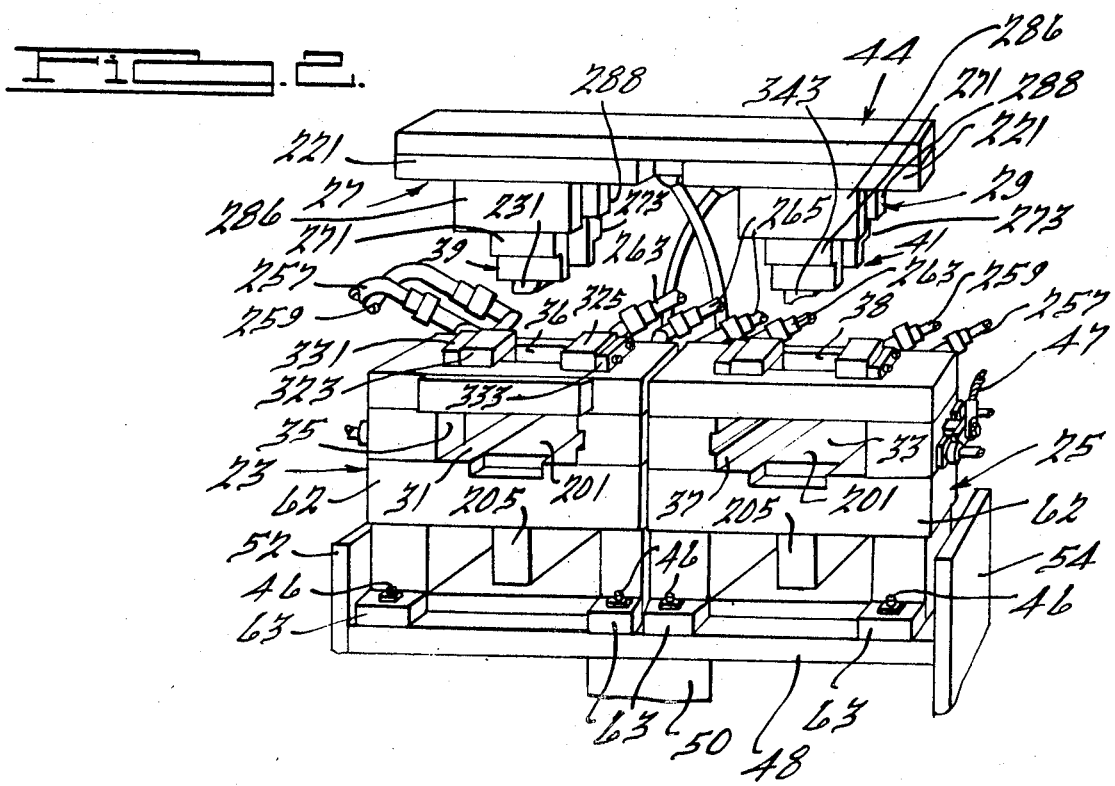

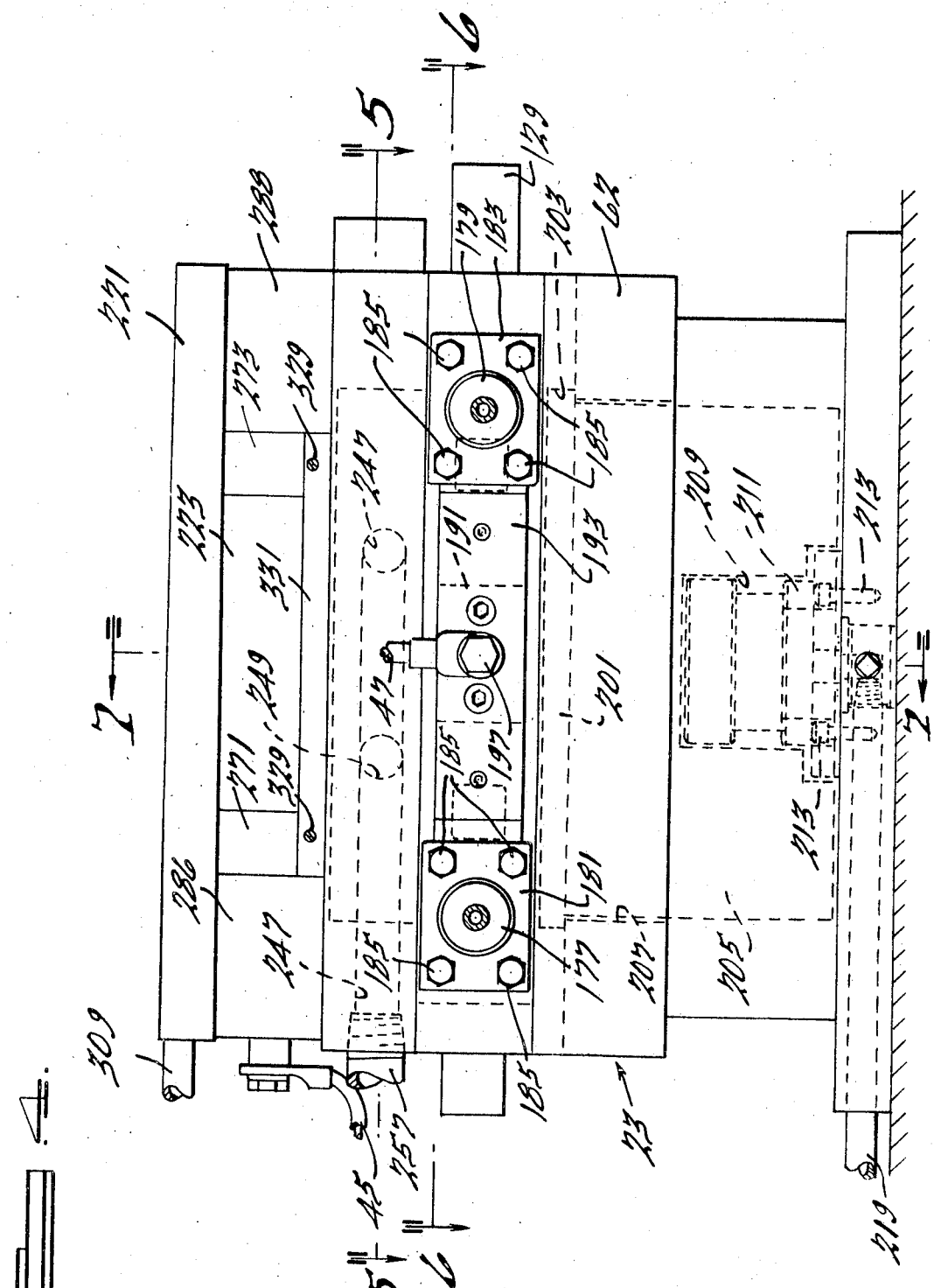

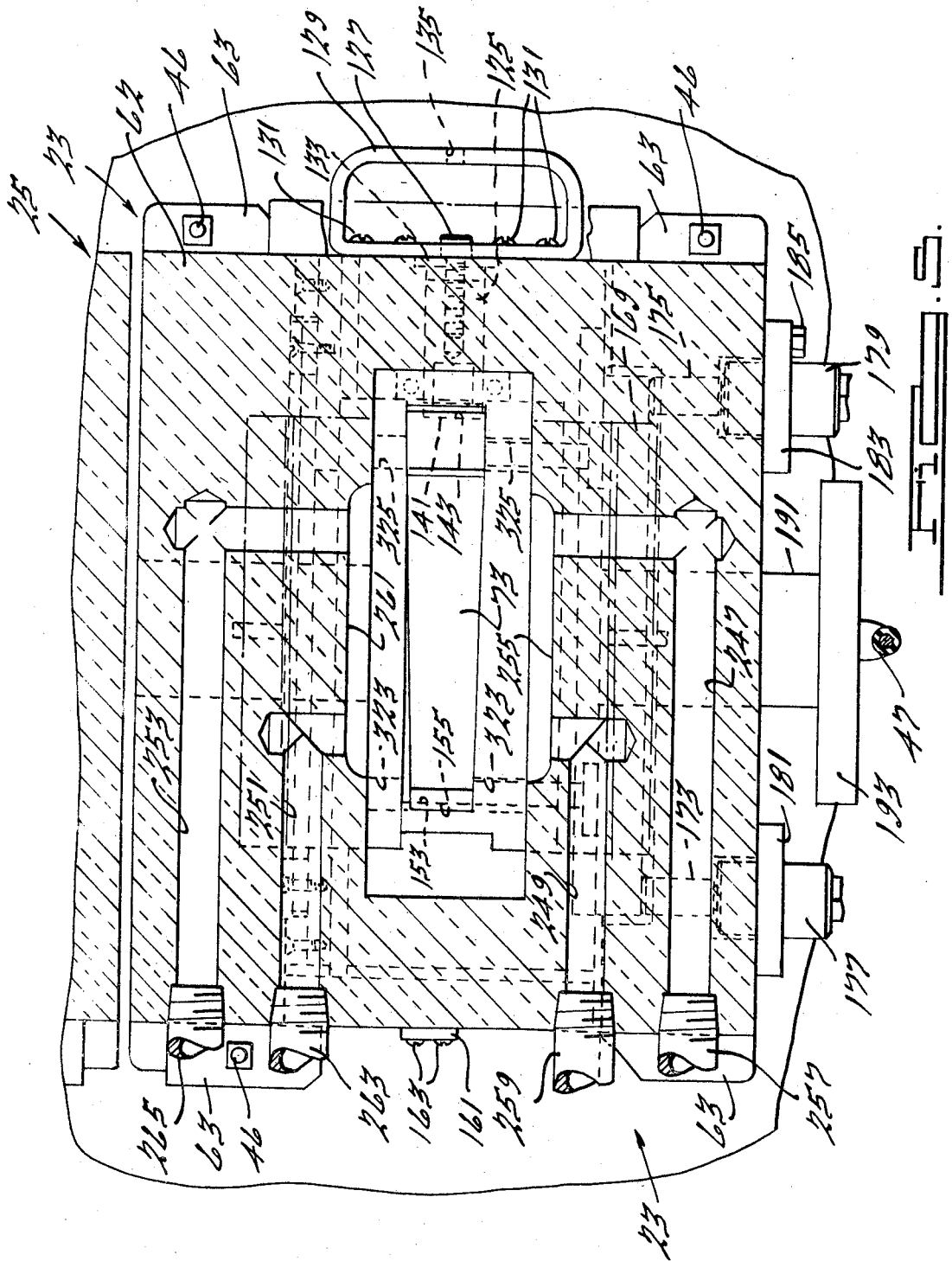

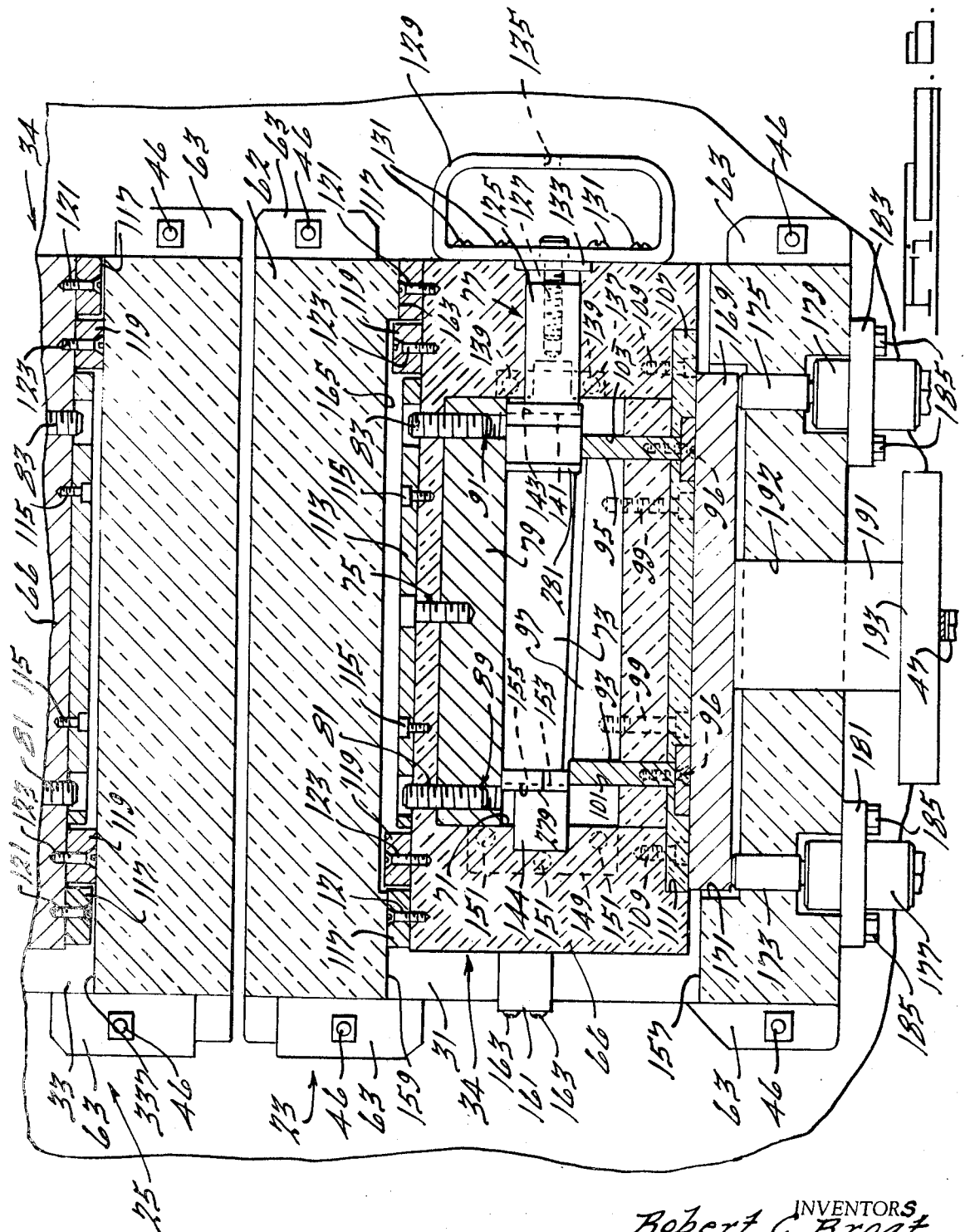

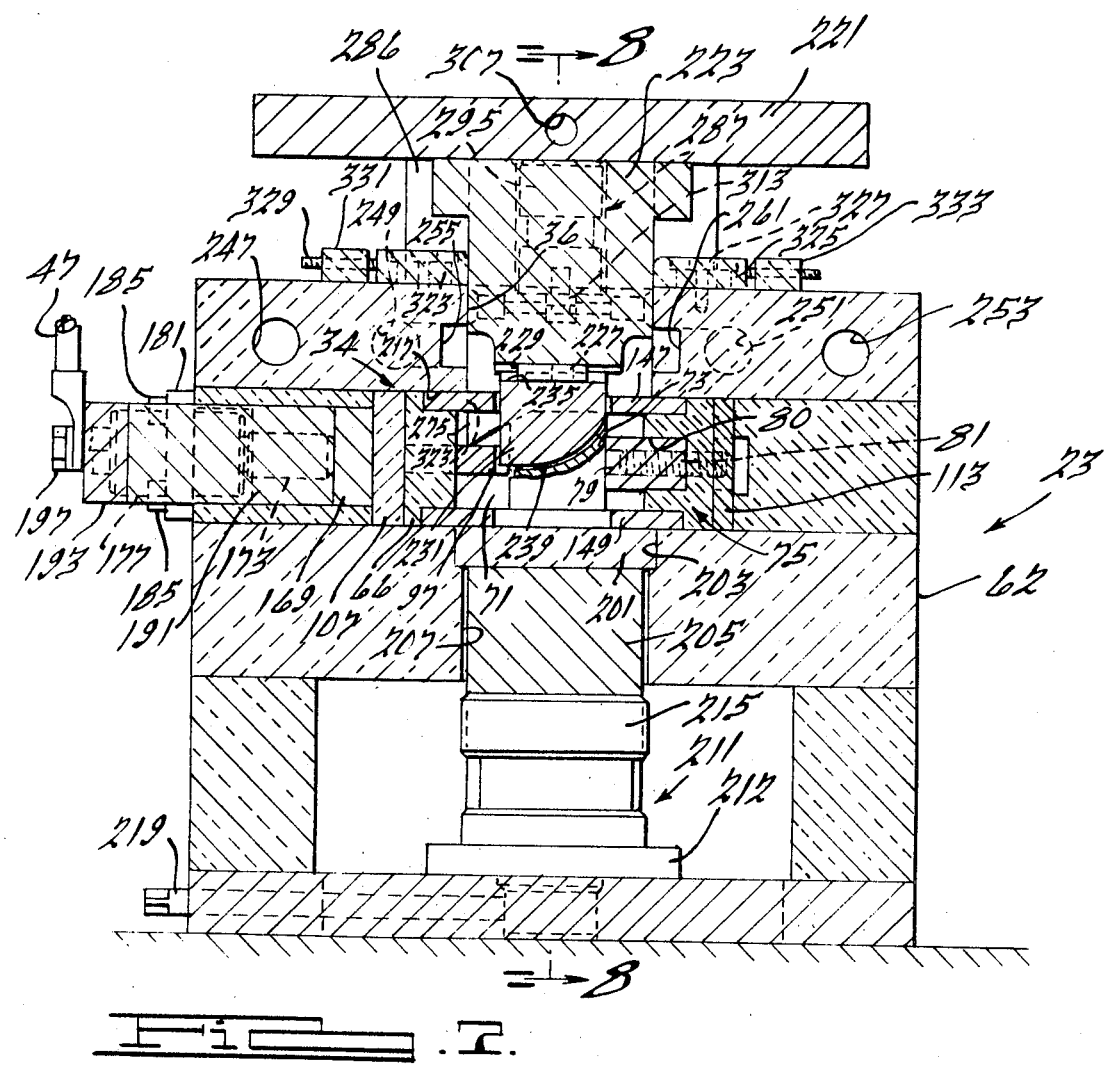

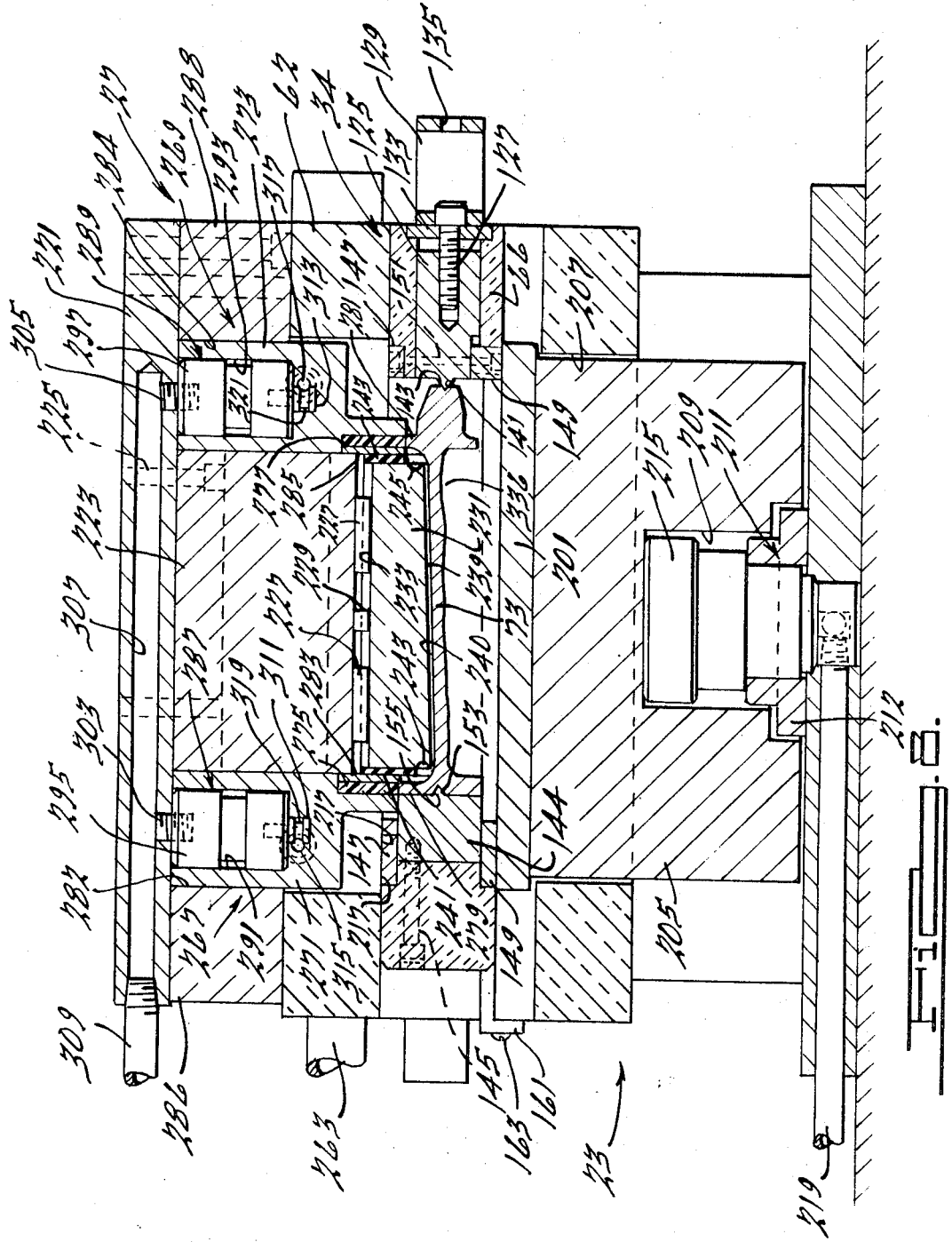

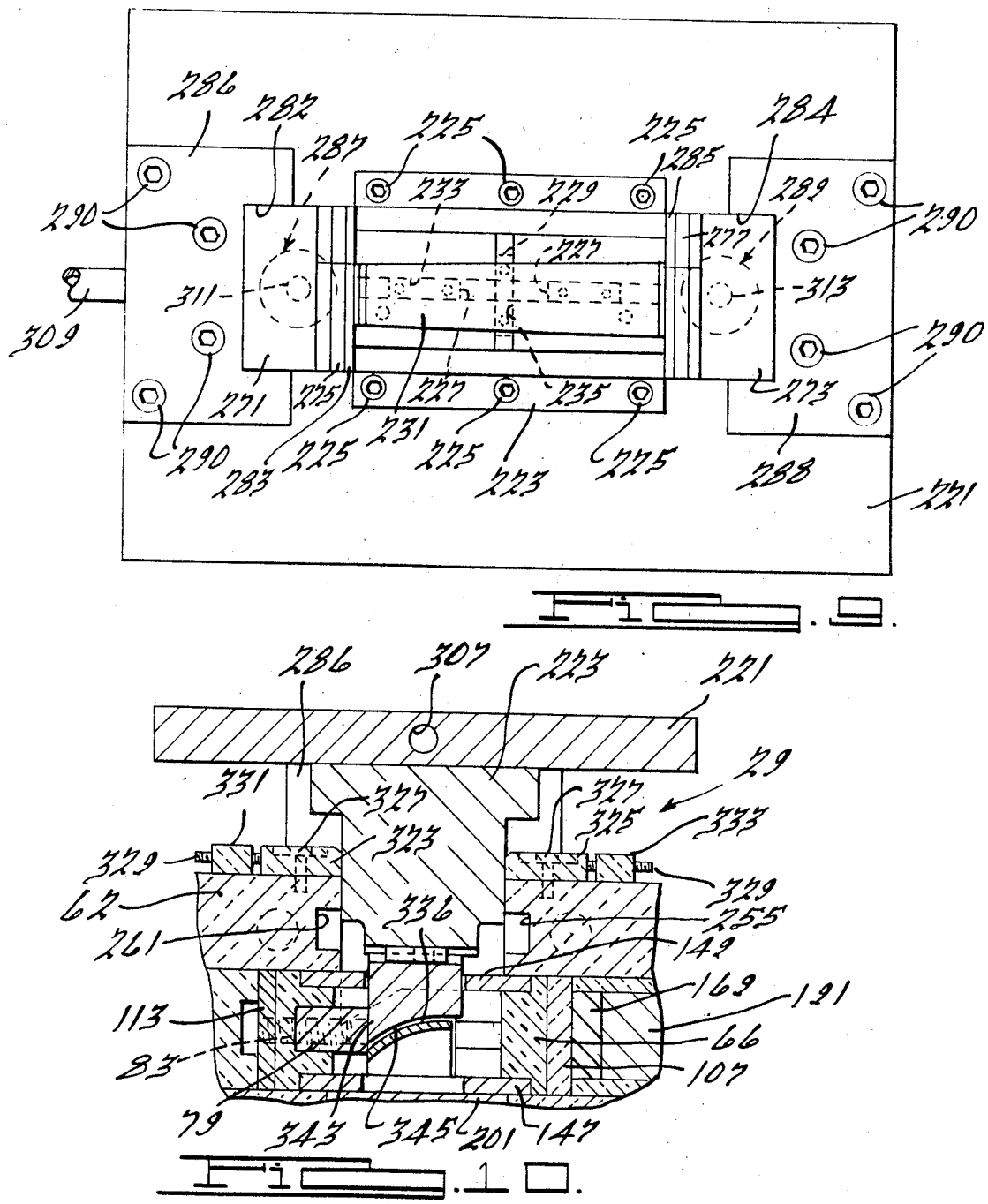

3,515,659
APPARATUS FOR ELECTRO CHEMICAL
MACHINING
Robert C. Broat, Vernon Center, Walter H. Krupa, New
York Mills, and George William Cooley, Utica, N.Y.,
assignors to Kelsey-Hayes Company, Romulus, Mich.,
a corporation of Delaware
Filed Jan. 30, 1967, Ser. No. 612,576
Int. Cl. B23p 1/02, 1/16
U.S. Cl. 204—224                                18 Claims

ABSTRACT OF THE DISCLOSURE

A device for the electro chemical machining of hard metallic parts such as turbine blades or the like. A part to be machined is placed in a shuttle that is inserted in a fixture between relatively movable electrodes shaped to the configurations to be produced on the opposite sides of the part. The fixture has die cavities to receive the electrodes and it is formed with passages for the high volume flow of electrolyte through said cavities between the opposite sides of the part and the electrodes. This flow is assisted by the provision of "dams" in the die cavities that contain the electrolyte and enhance its high velocity flow across the part.

---

This invention relates generally to electro chemical machines, and particularly to an improved electrolytic metal machining apparatus.

Importat objects of the present invention are to provide an improved electrolytic machining apparatus capable of rapid metal product machining and one requiring minimal component replacement to machine a variety of metal products.

Another object of the present invention is to provide an improved machining apparatus of the above character capable of highly accurate and efficient metal product machining.

Another object is to provide an improved machining apparatus of the above character which facilitates rapid and easy set-up and maintenance during use.

Further objects of the present invention include the provision of a machining apparatus of the above character which is relatively inexpensive to manufacture, durable in construction and reliable in use.

Other objects and advantages of the present invention will become more apparent from a consideration of the following detailed description taken in conjunction with the drawings in which:

FIG. 1 is a schematic view illustrating an electrolytic machining system embodying the present invention;

FIG. 2 is a perspective view illustrating the machining apparatus schematically depicted in FIG. 1 shown in the inactive position and with certain components removed for clarity;

FIG. 3 is a view similar to FIG. 2, showing the positions of the components during the machining operation;

FIG. 4 is an enlarged side elevational view of one of the fixtures illustrated in FIG. 3;

FIG. 5 is a sectional view of FIG. 4 taken along the line 5—5 thereof and shown with the electrode removed for clarity;

FIG. 6 is a sectional view of FIG. 4 taken along the line 6—6 thereof;

FIG. 7 is a sectional view of FIG. 4 taken along the line 7—7 thereof;

FIG. 8 is a sectional view of FIG. 7 taken along the line 8—8 thereof;

FIG. 9 is a bottom plan view of the electrode illustrated in FIGS. 4, 7 and 8;

FIG. 10 is a fragmentary sectional view, similar to FIG. 7, illustrating the electrode employed with the other fixture illustrated in FIG. 3; and FIG. 11 is a perspective view illustrating one type of metal product workpiece particularly adapted for being machined utilizing the apparatus of the present invention.

Broadly described, the present invention comprises a fixture having first and second portions movable relative to each other at a controlled rate, a die cavity in said first portion a shuttle removably carrying a workpiece and positionable in said cavity, first clamp means on said shuttle for accurately positioning said workpiece relative thereto, second clamp means on said first fixture portion for accurately positioning said shuttle within said cavity, fluid inlet and outlet means communicating with said die cavity and with a source of electrolyte, electrode means carried by said fixture second portion and receivable in said die cavity, said electrode means having an outer working end shaped complementary to the desired contour of a surface of said workpiece, means supplying a positive voltage to said workpiece through said shuttle and supplying a negative voltage to said electrode means, and dam means in said die cavity causing electrolyte to flow under pressure from said inlet to said outlet and between said electrode means working end and said workpiece surface.

Referring now more particularly to the drawings, an electrolytic machining system embodying the present invention is illustrated schematically in FIG. 1 and is seen to include a pair of fixtures 19, 21 which comprise base fixture portions 23, 25 and top fixture portions 27, 29 respectively. The base fixture portions 23, 25 are provided with die cavities 31, 33 which are open at at least one end by windows 35, 37 and at their top through openings 36, 38, respectively, (FIGS. 2 and 3). Workpieces to be finished are mounted in shuttles 34 (FIG. 3) which are positionable in the cavities 31, 33 by insertion through the windows 35, 37. Electrolytic tool means 39, 41, each of which has an outer surface formed complementary to one surface to be formed on the workpieces, is carried by the top fixture portions 27, 29 and is positionable in the die cavities 31, 33 through the openings 36, 38, respectively, by moving the base fixture portions 23, 25 relative to the top fixture portions 27, 29.

Either the base fixture portions 23, 25 or the top fixture portions 27, 29 can be moved while the other remain stationary; or both may move, if desired. In the illustrated embodiment, the top fixtures 27, 29 are stationarily supported on a framework 44 and the base fixtures 23, 25 are fixed by bolts 46 to a movable platen 48. A ram 50 connects the platen 48 to a suitable drive means (not shown) and suitable fixed guide plates 52, 54 are provided to guide the platen 48 in its movement relative to the top fixtures 27, 29 (FIGS. 2 and 3). In addition, it will be appreciated that the base and top fixture portions 23, 25 and 27, 29, respectively, can be positionally reversed or, if desired, they can be mounted in horizontally disposed relation.

The tool means 39, 41 are connected by a lead 45 to the negative side of an electric power source 48 and the workpieces mounted in the shuttles 34 are connected by a lead 47 to the positive side of the source 43. Electrolyte is continuously delivered from a reservoir 49 through piping 51 by a pump 53 driven by a motor 55 to the die cavities 31, 33 and flows between the electrically charged tool means 39, 41 and workpieces which form electrolytic cathodes and anodes, respectively. By controllably moving the base fixture portions 23, 25 toward the top fixture portions 27, 29 to maintain a preselected gap between the tool means 39, 41 and the workpieces, material on the surface of the workpieces adjacent the tool means is removed according to the principles of electrolysis and is carried away by the continuously flowing electrolyte. The spent electrolyte returns to another reservoir 57 through return piping 59 and may be fed back into the reservoir after passing through a suitable filter 61. Upon completion of the electrolytic machining process, the platen 48 is retracted, the flow of electrolyte to the die cavities 31, 33 stopped and the shuttles 34 and workpieces carried thereby removed through the windows 35, 37.

Turning now to FIGS. 2–8, the base fixture portion 23 is seen to include a generally rectangular shaped body 62 having four outwardly extending pad-like feet 63, one adjacent each corner of the body 62, which feet rest on the platen 48 and through which the bolts 46 extend. The die cavity 31 is formed in the body 62 and for reasons that will become apparent, the body 62 is formed from a rigid, insulating and corrosion-resistant material, such as, for example, fiberglass. The body 62 can be of one-piece, integral construction, or can be formed, as shown, from a number of slabs or blocks joined together in suitable fashion.

As described briefly above, the workpieces are mounted in shuttles 34 which then are positioned in the die cavities 31, 33. One shuttle 34 is shown in position in the die cavity 31 in FIGS. 5–8 and is seen to include a body 66 adapted to be slidably inserted in the die cavity 31 and preferably also formed from a rigid, insulating, corrosion-resistant material, such as, for example, fiberglass. The shuttle body 66 has a generally rectangular shaped central opening 71 in which a workpiece 73 is removably positioned. Although this invention may apply to other types of workpieces, the workpiece 73 here is shown to be a turbine blade and is held in place in the shuttle opening 71 by side clamp screws 81 and 83 and an end clamp 77. As seen in FIG. 6 and 7 the side bar 79 is fixed in a recess 80 adjacent the shuttle opening 71 by side bar screw 75. The side clamp screws 81 and 83 threaded in shuttle body 66 and positioned in recesses 89 and 91 respectively, formed in side bar 79. The side clamp screws 81 and 83 engage one side of workpiece 73 and by threading clamp screws 81 and 83 the screws press the other side of the workpiece into engagement with the inner side of locating bar 97.

A fiberglass locating block 97 is fixed by screws 99 within the shuttle opening 71 opposite the side bar 79 and has openings 101 and 103 through which the contacts 93, 95 extend. These T-shaped electrical contacts 93 and 95 are constructed in two parts (a T-shaped body with cylindrical tip secured together by screws 96 and are of copper or other conductive material and may be loosely carried by the shuttle body or secured thereto by screws (not shown). The innermost edge of the locating block 97 preferably does not extend quite to the inner edges of the contacts 93, 95 so that a slight clearance exists between the workpiece 73 and the locating block 97 for a purpose to be disclosed. If desired, the shuttle body 66 may have one or more fiberglass filler bars 107 removably secured by screws 109 within a recess 111 therein to provide an adjustable and/or replaceable support for the contacts 93, 95. The other side of the shuttle body 66 has a rail 113 preferably of stainless steel or other corrosion-resistant, stiff material secured thereto by screws 115 for purposes of lending rigidity to the shuttle body 66. An outer and inner pair of locator feet 117, 119 are secured to the shuttle body 66 by screws 121, 123, respectively, beyond the rail 113 for a purpose to be described.

The workpiece end clamp 77 includes a fiberglass plunger 125 slidable within an opening 127 in one end of the shuttle body 66. A screw 127 extends freely through a handle 129 fixed by screws 131 to the shuttle body 66 and has its inner end threaded into the plunger 125. A washer 133 is fixed to the screw 127 and is rotatably trapped between the handle 129 and the body 66 so that by selectively turning the screw 127, the plunger 125 is moved axially toward or away from the workpiece 73. The handle 129 is apertured at 135 for the reception of a suitable wrench (not shown) to turn the screw 127.

The plunger 125 positions and helps support the workpiece 73 longitudinally within the shuttle opening 71. To this end, the plunger 125 has a transversely extended wedge-shaped inner end 141 adapted to engage in a wedge-shaped recess 143 in one end of the turbine blade workpiece 73. When the workpiece 73 is positioned in the shuttle opening and the screw 127 turned in a direction to move the plunger 125 toward the left, as seen in FIGS. 5, 6 and 8, the wedge end 141 of the plunger 125 engages the wedge slot 143 in the workpiece 73 and moves the workpiece against an insulating and corrosion-resistant locating block 144 in the shuttle opening 71 and fixed to the other end of the shuttle block 66 by screws 145. An upper and lower, generally rectangular wear plate 147, 149 are secured to the shuttle block 66 by screws 151 and sandwich the locating block 144 to locate it vertically.

The inner end of the locating block 144 has a transversely extending wedge-shaped projection 153 adapted to seat in a complementary-shaped recess 155 in the adjacent end of the workpiece 73. This, together with engagement between the projection 141 on the plunger 125 and the recess 143 in the other end of the workpiece 73 provides full support for and locates the workpiece vertically within the shuttle block opening 71.

In use, the workpiece 73 is positioned in the shuttle opening 71 and the wedge recess 155 seated on the locating block wedge projection 153. The screw 127 is then turned, moving the plunger 125 toward the workpiece 73 until the wedge projection 141 seats in the wedge recess 143 and holds the workpiece 73 against the locating block 144. Thereafter, the clamp screws 81, 83 are turned to clamp the workpiece 73 against locating bar 97. The transverse nature of the wedge projections 141, 153 and of the wedge recesses 143, 155 permits the workpiece 73 to slide laterally within the shuttle opening 71. When the workpiece 73 is secured, the shuttle 34 is ready to be inserted in the die cavity 31 of the base fixture 23 in preparation for the first machining sequence.

As shown in FIGS. 6–8, the fixture cavity 31 is generally rectangular in configuration and is provided with upstanding side walls 157, 159 spaced apart a distance slightly greater than the lateral dimension of the shuttle 34. The side wall 159 is relieved or recessed at 165 and this relief area is spaced from the side wall 157 a distance greater than the lateral dimension of the shuttle 34 measured at the locator feet 119.

The shuttle 34 is adapted to be inserted into the die cavity 31 from the front or right, as seen in FIG. 6, up to a point where the innermost end of the shuttle body 66 engages a stop member 161 extending into the die cavity 31 and fixed to the base fixture body 62 by screws 163. The stop member 161 is so positioned that at this point, the locator feet 117 are opposite the side wall 159 and the locator feet 119 are opposite the relief area 165. A normally retracted side clamp plate 169 is positioned within a recess 171 in the side wall 157 but is movable toward the shuttle 34 under the action of a pair of piston rods or plungers 173, 175 forming a part of hydraulic cylinders 177, 179, respectively. The cylinders 177, 179 are secured to the side of the fixture body 62 through mounting plates 181, 183 and screws 185. The side clamp plate 169 is constructed from electrically conductive material, such as, for example, copper, and is adapted to engage the contacts 93, 95 on the shuttle block 66 so that when the cylinders 177, 179 are energized to extend the plungers 173, 175, the side clamp plate 169 moves the shuttle body 66 away from the side wall 157 and presses the locator feet 117 tightly against the side wall 159. The side clamp plate 169 is fixed to an electrically conductive bar assembly which includes a contact bar 191, extending slidably through an opening 192 in the fixture 23, and a mounting plate 193. The electrical lead 47 is connected to the mounting plate 193 by a screw 197 and electrically interconnects the bar assembly with the electrical source 43. Thus, when the cylinders 177, 179 are energized and the clamp plate 169 pressed against the contacts 93, 95, which in turn contact the workpiece 73. The shuttle 34, therefore, is securely and accurately positioned laterally in the die cavity 31 and the workpiece is electrically connected to the source 43 through the lead 195, the mounting plate 193, the contact bar 191, the clamp plate 169 and the contacts 93, 95.

In addition to lateral clamping, the shuttle 34 is clamped vertically after it is positioned in the die cavity 31. To this end, a bottom clamp plate 201 is positioned in a recess 203 in the fixture body 62 and may be secured in suitable fashion to a mounting block 205 slidable vertically in an opening 207 in the fixture body 62, which opening communicates with the recess 203. The bottom of the mounting block 205 is hollowed out at 209 and receives a hydraulic cylinder 211. A sleeve 212 secured to the cylinder 211 is fixed to the fixture body 62 by screws 213 (FIG. 4). A piston 215 is movable relative to the cylinder 211 and engages the mounting block 205 so that when pressurized fluid is admitted to the cylinder 211, the piston 215 moves upwardly and moves the mounting block 205 upwardly and the bottom clamp plate 169 into engagement with the bottom wear plate 149 on the shuttle 34. This, in turn, presses the shuttle 34 upwardly and seats the top wear plate 147 against a shuttle body surface 217 which defines the top of the die cavity 31. A fluid conduit 219 inter-connects the cylinder 211 and a source of hydraulic pressure (not shown) and conducts fluid pressure to and from the cylinder 211 in the usual manner to controllably raise and lower the bottom clamp plate 201.

After the workpiece 73 is positioned in the shuttle 34, the shuttle in the die cavity 31 and clamped by the plates 169, 201, the base fixture portion 23 and the framework 44 are moved relatively toward each other to bring the tool means 39 adjacent the workpiece 73 in preparation for the electrolytic machining process. As described above, in this embodiment, the tool means 39 is carried by the top fixture portion 27 mounted on the framework 44 which remains stationary while the base fixture 23 is moved upwardly by a suitable drive means (not shown) which moves the ram 50 and the platen 49 upon which the base fixture 23 is supported. Of course, the entire device could be oriented so that the fixture portion 27 will move horizontally. Also, it is immaterial which of the fixture portions remains stationary and which one moves.

As seen in FIGS. 2, 3, 7, 8 and 9, the top fixture portion 27 comprises a mounting plate 221 adapted to be secured to the framework 44 (FIGS. 2 and 3) by suitable means (not shown). A cathode mounting block 223 is secured to the mounting plate 221 by screws 225 and has longitudinally and transversely extending projections 227, 229 on the lower surface thereof. A cathode 231, preferably constructed of copper, has longitudinally and transversely extending slots 233, 235 receiving the projections 227, 229 and the cathode 231 is fixed to the mounting block 223 by suitable screws (not shown). The cathode 231 has a downwardly facing convex cross-sectional working surface 239 having the same profile as that desired on one side 240 of the workpiece 73 (FIG. 11) and is provided with a pair of insulating blocks 241, 243, one at either end thereof, for a purpose to be described. In addition, the cathode is milled at both sides adjacent its lower end forming cavities 243, 145, also for a purpose to be described.

In the use of the electrolytic machining device, the lower fixture 23 is moved upwardly to position the workpiece surface 240 adjacent the cathode surface 239. The workpiece 73 is connected to the positive side of the electrical source 43 through the lead 47 while the cathode 231 is connected through the lead 45 to the negative side of the source 43. Electrolyte, such as, for example, salt water solution, is delivered from the reservoir 49 through the gap between the workpiece and cathode surfaces 240, 239. In accordance with the principles of electrolysis, metal is continuously removed from the surface 240 of the workpiece 73 adjacent the cathode surface 239 and is carried away with the moving electrolyte back to the rservoir 57. This contaminated electrolyte has the metallic particles removed by the filter 61 and is redelivered from the reservoir 49 back to the die cavity 31 by the pump 53.

To deliver and remove the electrolyte to and from the die cavity 31, the base fixture body 62 is provided with a pair of electrolyte inlets 247, 249 and a pair of electrolyte outlets 251, 253. The inlets 247, 249 communicate with an inlet electrolyte distribution pocket 255 formed in the body 62 within the die cavity, and with a pair of inlet conduits 257, 259 connected with the piping 51. The outlets 251, 253 communicate with an outlet electrolyte distribution pocket 261, opposite the pocket 255, and with a pair of outlet conduits 263, 265 connected with the piping 59.

After the workpiece 73 is positioned in the shuttle 34, the shuttle 34 in the die cavity 31 and the anode workpiece surface 240 adjacent the cathode surface 239, electrolyte is delivered through the piping 51, the conduits 257, 259, the passages 247, 249 and into the distribution cavity 255. From here, the electrolyte flows downwardly along one side of the cathode 231 toward the shuttle body 66 and between the cathode surface 239 and the workpiece surface 240 adjacent thereto. The emerging electrolyte then flows upwardly along the other side of the cathode 231, into the outlet distribution pocket 261, through the passages 251, 253, the conduits 263, 265 and piping 59 back to the reservoir 57.

It has been discovered that the efficiency of the electrolytic process is enhanced substantially if the electrolyte is made to move at high velocity from the inlet distribution pocket 255, through the die cavity 31 to the outlet distribution pocket 261. To achieve this, it is necessary to seal off the die cavity 31 and maintain a relatively constant pressure therein. To this end, a pair of dams generally indicated at 267, 269 are carried by the top fixture 27 and are adapted to cooperate with the ends of the workpiece 73 and the shuttle body 66 adjacent thereto. The dams 267, 269 include bodies 271, 273 which depend from the mounting plate 221 and which have dam plates 283, 285 secured thereto adjacent the lower ends thereof as by screws (not shown). Resilient backing 275, 277 is positioned between the plates 283, 285 and their respective bodies 271, 273. In addition, the dam plates 283, 285 bear against the cathode insulating blocks 241, 243 respectively.

The dam bodies 271, 273 have one side thereof slidably positioned in slots 282, 284 in slide blocks 286, 288 respectively, fixed to the mounting plate 221 by screws 290. The other side of the bodies 271, 273 slidably engage the electrode mounting block 223. The dam bodies 271, 273 are normally biased in a direction away from the mounting plate 221 by compression spring means, or, as shown in FIG. 8, by hydraulic motors 287, 289 positioned in bores 291, 293 formed in the top of the bodies 271, 273, respectively. The motors 287, 289 include cylinders 295, 297 fixed to the mounting plate 221 by threaded nipples 303, 305 which also communicate the cylinders 295, 297 with a passage 307 in the mounting plate 221 connected to a source of hydraulic pressure by a conduit 309. Pistons (not shown) which are slidably disposed within the cylinders 295, 297 are removably connected to the bodies 271, 273 through adapters 311, 313 secured to or integral with these pistons. Dowel pins 315, 317 extend through openings in the bodies 271, 273 and are positioned in grooves 319, 321 in the adapters 311, 313, respectively.

When the base fixture 23 is moved upwardly toward the top fixture 27, the backing 275, 277 and the dam plate 283, 285 are snugly but slidably received in slots 323, 325 formed in the wear plate 147. The backing 275, 277 sealingly engages flanges 279, 281 on the workpiece 73 and the dam plates 283, 285 slide on the insulating blocks 241, 243. The bottom clamp plate 201 seats securely against the bottom shuttle wear plate 149 so that electrolyte is prevented from flowing out the bottom of the shuttle opening 71. In addition, the longitudinal sides of the cathode mounting block 223 are slidably received in the base fixture opening 36 and snugly but slidably engage gauge blocks 323, 325 adjustably secured to the fixture body 62 adjacent the opening 36 by screws 327. The gauge blocks 323, 325, are securely backed by clamp screws 329 threadedly extending through clamp blocks 331, 333 fixed to the fixture body 62. Thus, the electrolyte entering the die cavity 31 from the inlet distribution pocket 255 is prevented from flowing out the top of the die cavity through the opening 36 by the gauge blocks 323, 325 and the dam plate backing members 275, 277 which engage the longitudinal sides of the cathode mounting block 223 and the workpiece flanges 279, 281, respectively, and is confined to flow downwardly in the die cavity 31 toward the workpiece 73. The electrolyte flows through the gap between the cathode surface 239 and the top surface of the workpiece 73 and then upwardly into the outlet distribution pocket 261. The milled grooves 243, 245 in the ends of the cathode 231 aid the passage of electrolyte. Since the die cavity 31 is "sealed off" during the process, the electrolyte is maintained at a predetermined pressure level. In order that this pressure is not exerted only on one side of the workpiece which might cause bending thereof, the electrolyte is permitted to flow beneath the workpiece 73 through the clearance between the locating block 97 and the workpiece 73. Engagement between the bottom clamp plate 201 and the shuttle wear plate 149 as described prevents loss of electrolyte through the bottom of the shuttle opening 71.

The electrolytic machining process is carried out by connecting the anode workpiece 73 and the cathode 231 to the positive and negative sides, respectively, of a source of electricity, controllably moving the cathode and anode workpiece relatively toward each other and continuously delivering electrolyte between the cathode and workpiece. The contour of the cathode surface 239 is complementary to that desired to be formed on the workpiece surface 240 which, before machined here, is somewhat irregular. The base fixture portion 23 is fed toward the top fixture portion 27, and the anode workpiece 73 toward the cathode 231 at a speed equal to the electrolytic dissolution rate. Initially, "high spots" on the workpiece surface 240 are at the correct distance from and define the proper gap with the cathode surface 239 and the "high spots" are machined at a more rapid rate than "low spots." As electrolytic dissolution proceeds, more of the anode workpiece surface 240 registers the desired spacing from the cathode surface 239 and the contour of the workpiece surface 240 takes on the contour of the cathode surface 239. The insulating blocks 241, 243 at the ends of the cathode 231 limit electrolytic dissolution to the surface of the anode workpiece 73 opposite the cathode surface 239 and prevents excessive dissolution at the workpiece flanges 279, 281. The base and top fixture portions 23, 27 continue moving relative to each other at the rate necessary to maintain the specified gap until the anode workpiece surface 240 is fully machined at which point movement of the base fixture portions 23, 25 is stopped either manually or automatically in response to a signal.

As described above, this embodiment contemplates moving the base fixture portion 23 toward the top fixture portion 27 employing a suitable drive mechanism. The workpiece 73 and the cathode 231 are connected to a suitable electrical source through the leads 43, 45 as described and the electrolyte is supplied to the die cavity 31 from the conduits 257, 259 and removed through conuits 263, 265. The details of and the controls for the fixture drive mechanism and the controls for the electrolyte flow have not been illustrated nor are they described in further detail here since controls and drive mechanism of this type are known in the art and can be installed and calibrated by the skilled engineer. In addition, it will be appreciate that the base fixture portions 23, 25 are totally insulated. However, as a practical matter, the entire fixture 19 may be encased in a suitable housing (not shown) to eliminate electrolyte spray and exhaust any hydrogen gases.

When the machining process on the concave workpiece surface 240 is completed, feeding movement of the base fixture portion 23 toward the top fixture portion 27 ceases, the flow of electrolyte is stopped and the electrical source 43 disconnected from the workpiece 73 and cathode 231. Thereafter, the base fixture portion 23 is lowered, the side clamping cylinders 177, 179 and the bottom clamping cylinder 211 released whereupon the shuttle 34 can be removed from the die cavity 31 by means of the handle 129. The other surface 336 of the workpiece is substantially the reverse of the surface 240 and is convex in cross-section. At this point, the concave surface of the workpiece 73 has been machined while the convex surface yet remains to be finished. To machine this surface 336, the base fixture portion 25 and the top fixture portion 29 are employed.

As shown in FIGS. 1–3, the base fixture portion 25 is structurally similar to the base fixture portion 23 and both base fixture portions 23, 25 are secured in the same fashion to the platen 48 for conjoint movement. In like fashion, the top fixture portion 29 resembles the top fixture portion 27 and both are secured to the framework 44. Thus, except for certain structural differences between the base fixture portions 23, 25 and between the top fixture portions 27, 29, a detailed description of the fixture portions 25, 29 is omitted here, it being understood that like numerals refer to like parts in all the figures.

Turning now to FIGS. 2, 3, 6 and 10, the base fixture portion 25 and the die cavity 33 therein are seen to be reversed in arrangement from the base fixture 23 and the die cavity 31. The die cavity 33 has upstanding side walls 335, 337 spaced apart a distance slightly greater than the lateral dimension of the shuttle 34 measured at the locator feet 119. As was the case with the base fixture 23, a side clamp plate 169 is positioned within a recess 171 therein and is movable toward the shuttle 34 under the action of plungers 173, 175, connected to cylinders 177, 179 identical in all respects to those described above for the base fixture 23.

As described above, the base fixture 25 is employed in machining the other side surface 336 of the workpiece 73 from that machined in the base fixture 23. Thus, the shuttle 34 is turned over when removed from the die cavity 31 and before insertion into the die cavity 33. When fully inserted in the die cavity 33, the shuttle 34 is positioned as shown in FIGS. 6 and 10 with the forwardmost end of the shuttle body 62 engaging an end stop 161 similar to that described above for die cavity 31. When the cylinders 177, 179 are energized, the side clamping plate 169 presses the locator feet 119 into engagement with the side wall 335 and the shuttle 34 is then located in accurate lateral relation within the die cavity 33. Thereafter, a bottom clamp plate 201, substantially identical in structure and operation to the bottom clamp plate 201 in the base fixture portion 23 is energized to seat the shuttle against the top of the die cavity 33 and close off the bottom of the shuttle opening 71.

The top fixture 29 is identical in all respects to the top fixture portion 27 except that a different electrode is employed. As shown in FIG. 10, this electrode 343 has a concave working surface 345 which conforms to the contour desired on the convex surface 336 of the workpiece 73. In all other respects, the top fixture 29 is identical to the top fixture 27 so that a detailed description is omitted here.

After the shuttle 34 is clamped in place within the die cavity 33, the base fixture portion 25 is raised to bring the workpiece 73 adjacent the electrode 343. The workpiece 73 and electrode 343 are connected to the electrical source 43 and electrolyte is delivered through the gap between the electrode surface 345 and the convex surface 336 of the workpiece 73. The base fixture 25 is then controllably raised to maintain a predetermined gap between the electrode 343 and the workpiece 73 and the convex surface 336 of the workpiece 73 is therefore finished according to the process of electrolysis as was the concave surface 210.

By way of example, the following is given to illustrate a typical set of conditions employed when reaching a turbine blade:

Current—10,000 amps
Voltage—10 volts
Gap—0.010 inch
Fixture feed rate—0.080 in./min.
Electrolyte temperature—110° F.
Electrolyte pressure—200 p.s.i.

It will be appreciated that the sequence of operations for the base and top fixture portions 25 and 29 is the same as that of the base and top fixture portions 23 and 27 so that the base fixture portions 23, 25 are advantageously secured to the same platen 48 for conjoint movement, and the top fixture portions 27, 29 are secured to the same framework 44. In addition, only one set of controls is needed to effect movement of the platen 48 and delivery of the electrolyte to the cavities 31, 33. Furthermore, and perhaps most significantly, both surfaces 240, 336 of the workpiece 73 are finished using one shuttle 34. All that is necessary is to remove the shuttle 34 from the cavity 31, turn it over and insert it into the cavity 33.

It will be apparent that by employing a number of shuttles, a plurality of workpieces can be finished in rapid fashion, i.e., while one side of one workpiece is being finished in the die cavity 31, the other side of another workpiece is being finished in the die cavity 33. Furthermore, and of great importance is the fact that a variety of workpieces can be finished using the basic structure described above. Thus, only the electrodes 231, 343 and possibly the shuttle 34 need be replaced to finish other workpieces of the same size range. This, of course, greatly increases the versatility and overall value of the device of the present invention.

By the foregoing, there has been disclosed an improved electrolytic finishing device calculated to fulfill the inventive objects set forth, and while a preferred embodiment has been illustrated and described above in detail, various additions, substitutions, modifications and omissions may be made thereto without departing from the spirit of the invention as encompassed by the appended claims.

What is claimed is:

1. An electrolytic machining device comprising a fixture having first and second portions movable relative to each other at a controlled rate, a die cavity in said first portion, a shuttle removably carrying a workpiece and slidably positionable in said cavity through a side wall thereof, means on said shuttle for accurately positioning said workpiece relative thereto, means for accurately positioning said shuttle within said cavity, fluid inlet and outlet means communicating with said die cavity and with a source of electrolyte, electrode means carried by said fixture second portion and receivable in said die cavity, said electrode means having an outer working end shaped complementary to the desired countour of a surface of said workpiece, means supplying a positive voltage to said workpiece through said shuttle and supplying a negative voltage to said electrode means, and dam means in said die cavity engageable with the workpiece and operable to direct the flow of electrolyte under pressure across said workpiece surface from one side thereof to the opposite side thereof as it flows from said inlet to said outlet.

2. A device as defined in claim 1 wherein said shuttle includes a body having an opening therein receiving said workpiece, said first clamp means including a pair of clamp members movable in directions normal to each other.

3. A device as defined in claim 1 wherein said fluid inlet and outlet means are disposed on opposite sides of said die cavity.

4. A device as defined in claim 1 wherein said dam means includes a first pair of dam members carried by said second fixture portion and cooperable with said shuttle and said workpiece, and a second pair of dam members carried by said first fixture portion and cooperable with said electrode means.

5. A device as defined in claim 4 including means normally biasing said first pair of dam members toward said first fixture portion.

6. A device as defined in claim 9 wherein each said die cavity and said shuttle are generally rectangular in cross-section, said second clamp means in each of said fixture first portions including a pair of clamps having movable portions acting in directions normal to each other and to adjacent walls of said die cavity.

7. A device as defined in claim 6 wherein one of said clamp movable portions in each said first fixture portions includes a plate disposed in a recess in each said first fixture portion adjacent said die cavity, conductive means connected to each said plate, and fluid motor means engageable with each said plate to move said plates against said shuttle.

8. A device as defined in claim 6 wherein said shuttle includes a generally rectangular body having first and second removable locator means on one side thereof, said die cavity in said first fixture portions of said pair of fixtures having locator means cooperable with said first and second locator means, respectively, on said body, stop means in each said die cavity engageable with said body to position said locator means on said body and in said cavities opposite each other, one of said clamp movable portions in each said cavity adapted to press a respective one of said shuttle body locator means into engagement with said die cavity locator means.

9. A device as defined in claim 1 which includes a pair of said fixtures, the first and second portions of which are movable conjointly relative to each other at said controlled rate, said shuttle being positionable in one orientation in the cavity of a first of said fixtures and in another orientation opposite to said one orientation in the cavity of the other of said fixtures, said fixtures including electrode means having an outer working end shaped complementary to the desired contour of opposite surfaces of said workpiece.

10. A device as defined in claim 9 wherein said die cavity and said shuttle are generally rectangular in cross section, said second clamp means including a pair of clamps having movable portions acting in directions normal to each other and to adjacent walls of said die cavity.

11. A device as defined in claim 10 wherein one of said clamp movable portions electrically interconnects an electrical source and said workpiece.

12. A device as defined in claim 11 wherein said shuttle includes a non-conductive body having a central opening in which said workpiece is disposed, electrical conductive means extending through said body and engaging said workpiece, said one clamp movable portion being engageable with said conductive means.

13. A device as defined in claim 12 wherein said conductive means is loosely carried by said body.

14. A device as defined in claim 11 wherein said fixture first portion includes a non-conductive body, said one clamp movable portion extending through said body into said die cavity and connected to an electrical source.

15. A device as defined in claim 14 wherein said one clamp movable portion includes a plate disposed in a recess in said body adjacent said cavity, conductive means extending through said body and connected to said plate, and fluid motor means carried by said body and engageable with said plate to move said plate against said shuttle.

16. A device as defined in claim 10 wherein said shuttle includes a generally rectangular body having removable locator means on one side thereof, said die cavity having locator means cooperable with said locator means on said body, stop means in said die cavity engageable with said body to position said locator means on said body and in said cavity opposite each other, one of said clamp movable portions adapted to press said shuttle body locator means into engagement with said die cavity locator means.

17. A device as defined in claim 16 wherein the other of said clamp movable portions includes a screw movable into said die cavity and engageable with said body to press said body against a fixed surface in said cavity.

18. A device as defined in claim 17 wherein said shuttle body is provided with an opening adapted to receive said workpiece, said screw being adapted to close one side of said shuttle body opening remote from said electrode means.

References Cited

UNITED STATES PATENTS

| | | | |
|---|---|---|---|
| 3,403,084 | 9/1968 | Andrews | 204—224 |
| 3,390,068 | 6/1968 | Ellis et al. | 204—224 |
| 3,305,470 | 2/1967 | Williams et al. | 204—224 |
| 3,288,699 | 11/1966 | Trager et al. | 204—224 |
| 3,271,283 | 9/1966 | Clifford et al. | 204—224 |
| 3,095,364 | 6/1963 | Faust et al. | 204—224 |
| 2,765,394 | 10/1956 | Griffith | 204—224 |

JOHN H. MACK, Primary Examiner

S. S. KANTER, Assistant Examiner

U.S. Cl. X.R.

204—285